United States Patent [19]
Taylor et al.

[11] 4,069,648
[45] Jan. 24, 1978

[54] TOBACCO HARVESTER

[76] Inventors: Miller Taylor; Jimmy N. Taylor; Oren M. Taylor, all of Highway 701 South, Elizabethtown, N.C. 28337

[21] Appl. No.: 667,321
[22] Filed: Mar. 16, 1976
[51] Int. Cl.² ............................................. A01D 45/16
[52] U.S. Cl. ................................................... 56/27.5
[58] Field of Search ....................... 56/27.5, 330, 14.4, 56/218, 327 R

[56] References Cited

U.S. PATENT DOCUMENTS

| | | | |
|---|---|---|---|
| 3,167,327 | 1/1965 | Bumpious | 56/218 |
| 3,453,815 | 7/1969 | Harrington et al. | 56/27.5 |
| 3,492,801 | 2/1970 | Olmo et al. | 56/330 |
| 3,507,103 | 4/1970 | Pickett et al. | 56/27.5 |
| 3,548,950 | 12/1970 | Phelan et al. | 56/327 R |
| 3,601,959 | 8/1971 | Pinkham | 56/27.5 |
| 3,868,811 | 3/1975 | Cicci et al. | 56/1 |
| 3,962,851 | 6/1976 | Moore | 56/27.5 |

FOREIGN PATENT DOCUMENTS

| | | | |
|---|---|---|---|
| 2,111,080 | 6/1972 | France | 56/330 |

*Primary Examiner*—Russell R. Kinsey
*Attorney, Agent, or Firm*—Sughrue, Rothwell, Mion, Zinn and Macpeak

[57] ABSTRACT

The tobacco harvester is pulled by a tractor having an offset hydraulically operated hitch arrangement which permits the harvester to be selectively positioned to the side of the tractor. A tobacco receiving trailer is coupled to the harvester by a hydraulically operated coupling whereby the trailer can be shifted forwardly and rearwardly alongside the harvester to insure the even distribution of tobacco within the trailer as it is supplied via a conveyor which is laterally shiftable to compensate for the lateral shifting of the harvester relative to the trailer. The harvester is provided with a pair of spaced apart defoliators adapted to be located on opposite sides of a tobacco row. The defoliators are mounted in a sub-frame which is mounted for lateral movement relative to the main frame. The defoliators may be comprised of elongated spiral webs rotatable about their own axes or may be comprised of a pair of oscillating bars having a plurality of laterally extending flexible fingers thereon. A conveying system is provided for transporting the leaves from the vicinity of the defoliators to the aforementioned reciprocatable conveyor.

7 Claims, 22 Drawing Figures

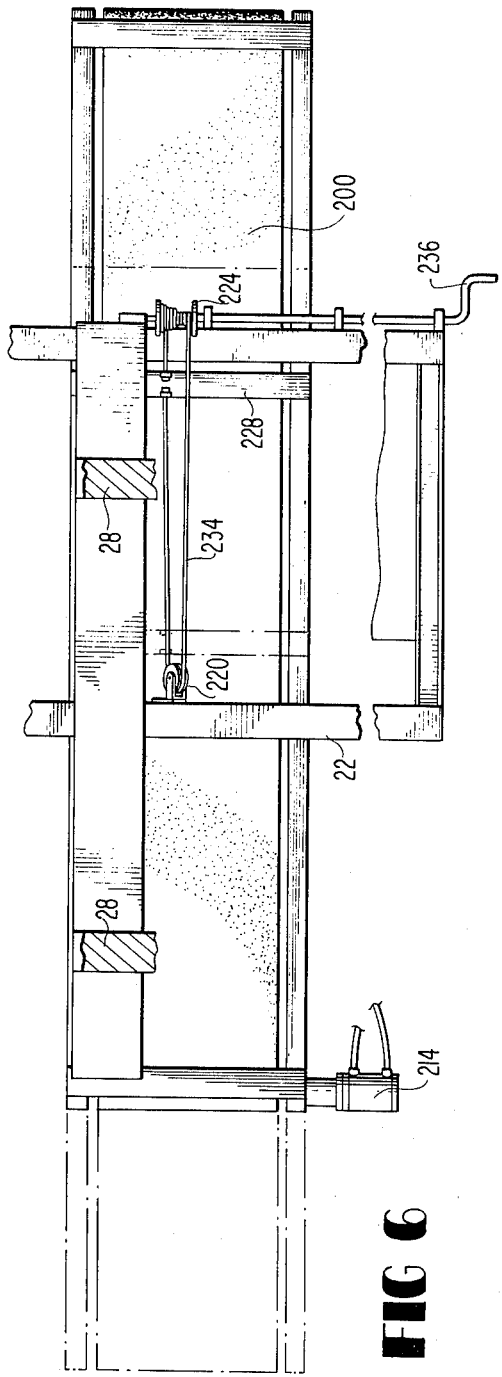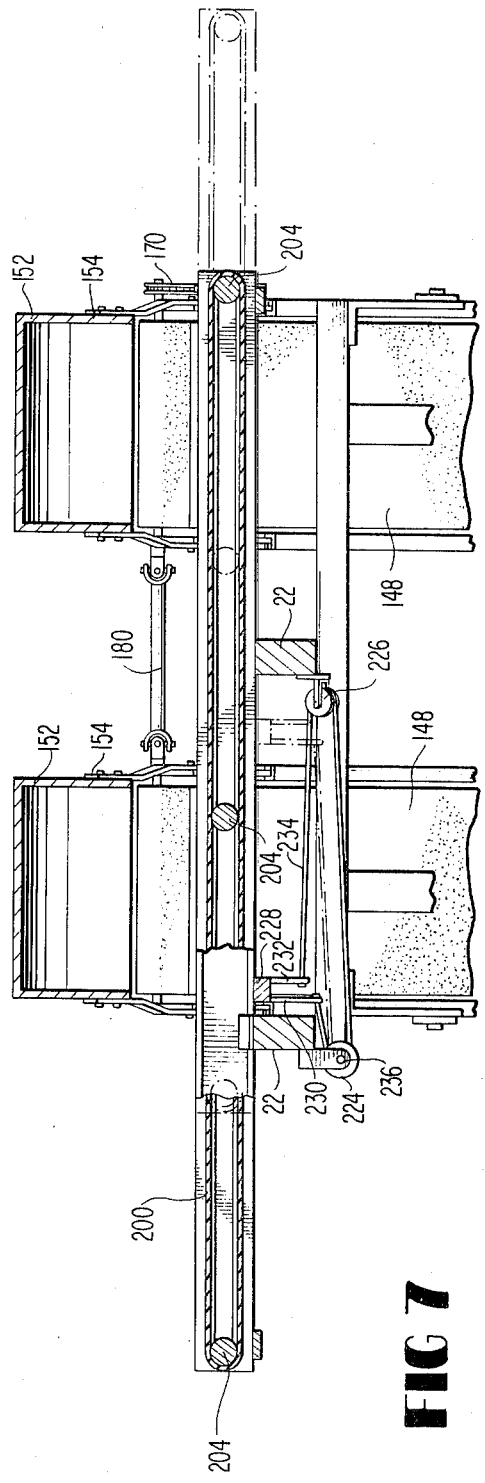

TOBACCO HARVESTER

BACKGROUND OF THE INVENTION

1. Field of the Invention

The present invention is directed to tobacco harvesters and more specifically to a tobacco harvester and trailer arrangement adapted to be pulled by a single tractor and having a unique defoliating and conveying arrangement for the tobacco leaves from the tobacco plants to the trailer.

2. Prior Art

For many years the harvesting of tobacco has been a manual operation. The tobacco must be harvested at a particular time in the growing season and the leaves of the plant ripen at different times. The leaves ripen progressively from the bottom to the top of the stalk thereby necessitating five or six successive passes through the field to remove the ripened leaves. Such manual harvesting methods required a great deal of manpower which has become increasingly scarce and more expensive in recent years.

The first type of mechanical tobacco harvester consisted primarily of a frame upon which the leaf primers would ride through the field as they manually remove the leaves.

In recent years various other types of mechanical tobacco harvesters were developed wherein the harvester would straddle the row of tobacco plants and a rotating defoliator would strip the lower leaves from the plant onto a conveyor mechanism for transfer to a suitable receptacle. The majority of these mechanical tobacco harvesters which carry out a priming operation are self-propelled and straddle one row of tobacco at a time. Other types of tobacco harvesters are adapted to be rigidly mounted on the side of a tractor but this type of tobacco harvester can only be utilized where the entire tobacco plant is cut and stripped since it is impossible to effectively operate on any row of tobacco except the one closest to the tractor. Generally, tobacco fields are planted with every fifth row missing to allow for the passage of tractors and trailers through the field. Thus, the tractor mounted units would be unable to harvest the middle rows of each group of four rows without first cutting down the outermost rows.

SUMMARY OF THE INVENTION

The present invention is directed to an improved tobacco harvester which is adapted to be pulled by a tractor by means of a hydraulically operated coupling which allows the tobacco harvester to be adjustably offset releative to the tractor so that the harvester can straddle either the first or second row of tobacco adjacent the tractor to carry out a priming operation.

The present invention also provides a new and improved harvester wherein the receptacle for the tobacco leaves is mounted on a trailer which is towed directly from the harvester by means of a hydraulic coupling which allows the trailer to be moved forwardly and rearwardly relative to the harvester to allow the even distribution of the tobacco leaves in the receptacle as they leave the conveying system of the harvester.

The present invention is directed to a new and improved tobacco harvester having first and second defoliator means located on opposite sides of a row of tobacco and mounted in a sub-frame for lateral movement relative to the main frame of the tobacco harvester to accommodate minor variations in row alignment. A plurality of rotatable rollers are mounted beneath each defoliator means in the sub-frame for laterally transferring the harvested leaves onto longitudinally moving conveyors mounted at each side of the main frame. The harvester is provided with substantially vertically disposed conveyor means for transferring the leaves upwardly to transversely disposed conveying means which will deposit the leaves into a receptacle on a trailer movable along side the harvester. The transverse conveyor means are laterally adjustable to compensate for the lateral adjustment of the harvester relative to the tractor to insure that the leaves will fall into the receptacle on the trailer.

The present invention provides a new and improved tobacco harvester wherein the defoliator means are comprised of a pair of spiral flexible webs rotatable about their own axis or a pair of oscillating rods having a resilient covering thereon with a plurality of laterally extending flexible fingers for engagement with the tobacco leaves being harvested. The defoliator means as well as the various conveyor means according to the present invention are driven by hydraulic motors connected in a common circuit with a tractor mounted pump and each of the hyraulic motors is mounted on the shaft to be driven by a new and improved quick disconnect arrangement.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 6 is a sectional view taken along the line 6—6 of FIG. 1.

FIG. 7 is a sectional view taken along the line 7—7 of FIG. 2.

DETAILED DESCRIPTION OF THE PREFERRED EMBODIMENTS

Figure 1:
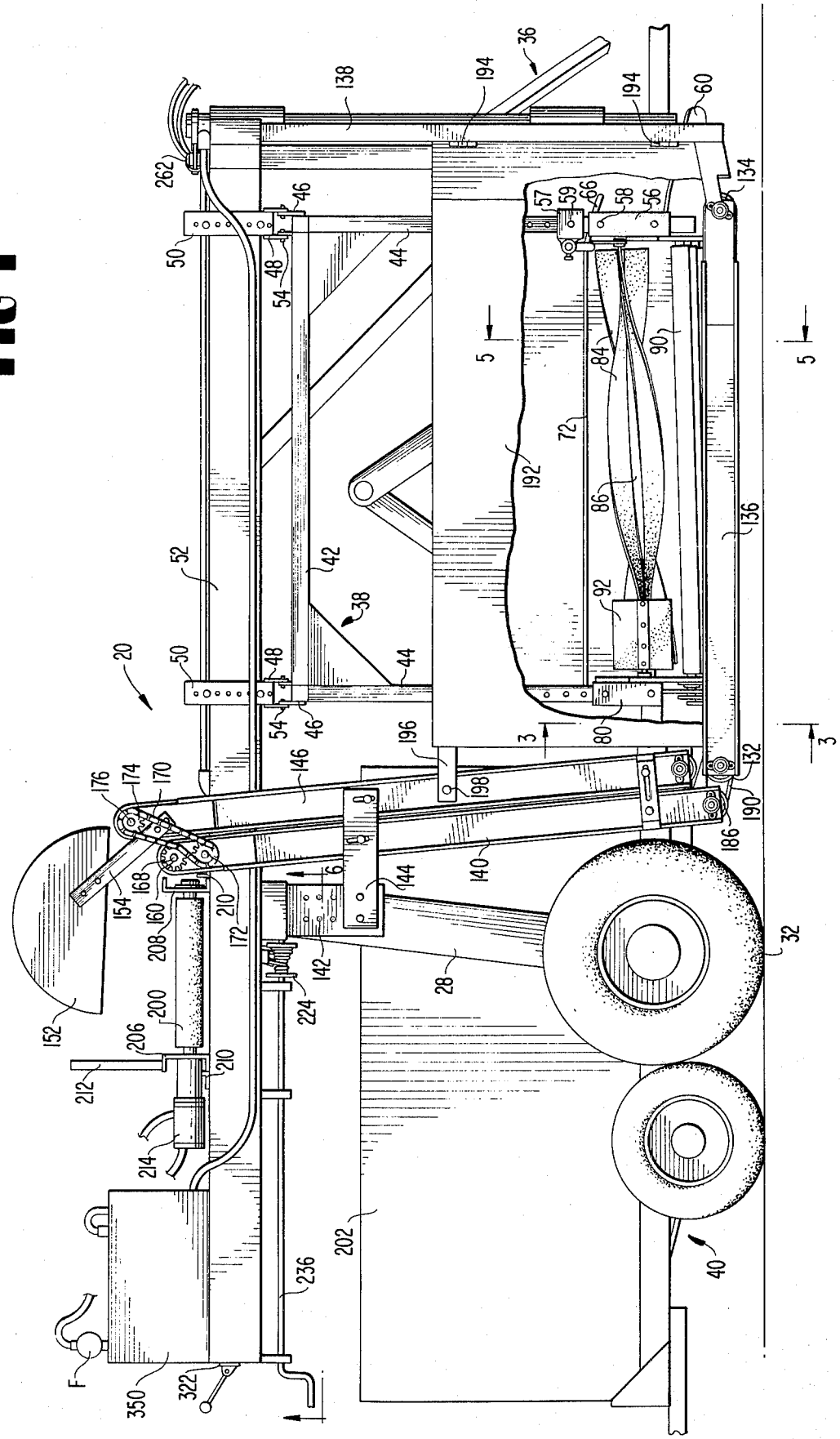
FIG. 1 is a side elevation view of the harvester according to the present invention with a portion thereof broken away for the sake of clarity.
Figure 2:
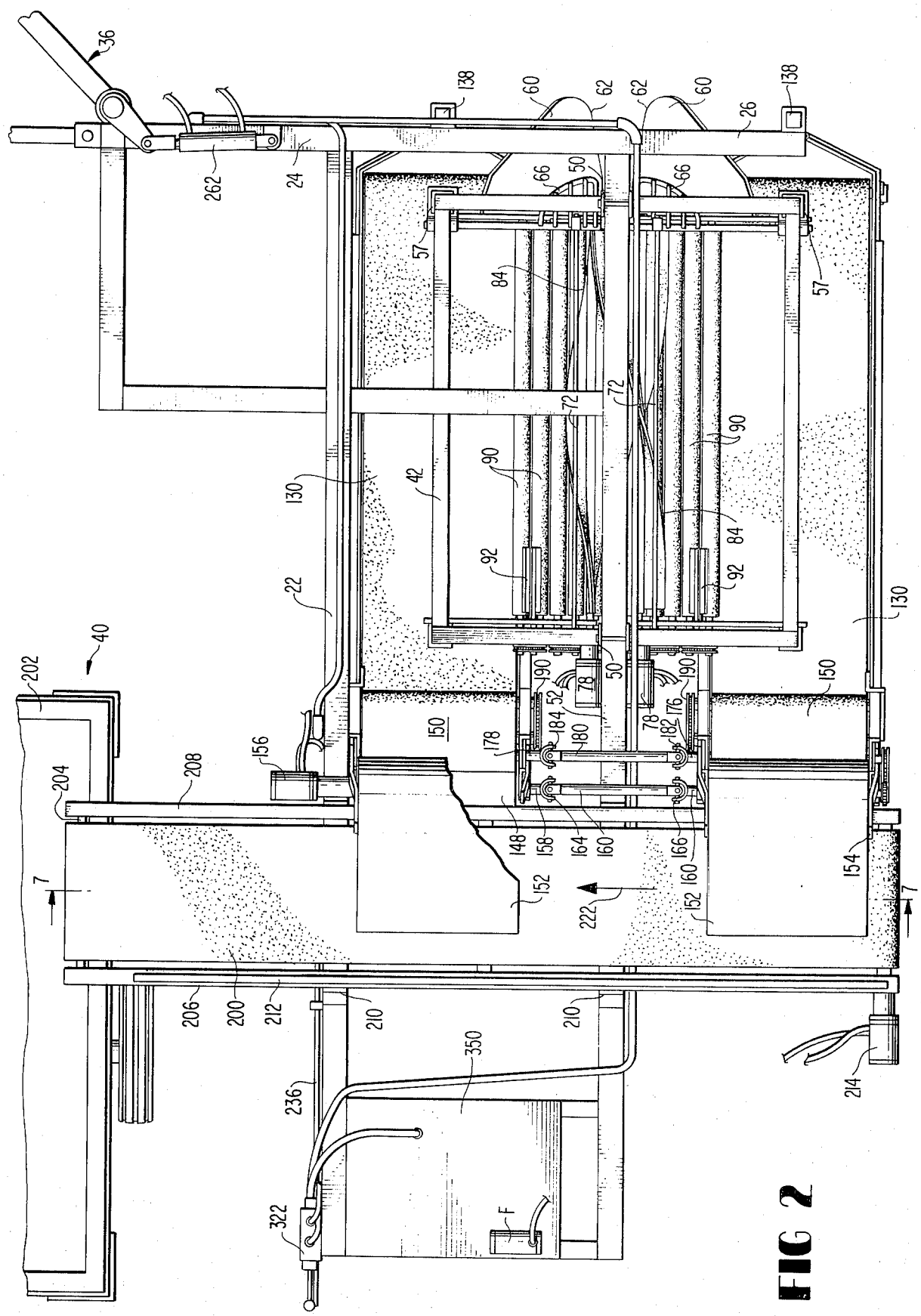
FIG. 2 is a top plan view of the tobacco harvester as shown in FIG. 1 with parts thereof broken away.

The tobacco harvester 20 according to the present invention is a trailer-type non-powered vehicle adapted to be towed by a tractor 30. An additional trailer 40 which is adapted to carry a conventional tobacco curing box can be towed either from the tobacco harvester 20 or the tractor 30 depending upon the type of hitch arrangement utilized.

The tobacco harvester 20 is provided with a main rectangular frame 22 having lateral extensions 24 and 26 extending outwardly therefrom at either side adjacent the front end of the harvester. A pair of downwardly extending beams 28 are provided, one at each side of the main frame 22 which carry the rear supporting wheels 32. A vertical support post 34 is connected to and extends downwardly from the outermost end of the lateral frame extension 24. A trailer tongue assembly generally designated at 36 is pivotably mounted on the support post 34 for connecting the harvester 20 to the tractor 30.

A defoliator carrying sub-frame generally indicated at 38 is comprised of a rectangular frame 42 having a downwardly extending post 44 at each corner. A pair of upstanding brackets 46 are connected to the midpoint of the transversely extending bars of the sub-frame. A pair of mating brackets 48 are secured to the longitudinally extending side beam 52 of the main frame 20 by straps 50. The two brackets 46 and 48 are connected together by means of pivot pins 54 so that the sub-frame carrying the defoliator means pivots for lateral movement relative to the main frame 20 to accommodate slight misalignments in the rows of tobacco plants.

A sleeve 56 is slidably mounted at the lower end of each of the front posts 44 of the sub-frame 38 and may be secured in one of several possible positions by means of bolts 58 extending through aligned apertures in the sleeve 56 and in the post 44. A pair of guide plates 60 having forwardly diverging opposed surfaces 62 are connected to the sleeves 56 for initially engaging the stalk 64 of a tobacco plant to center the frame with respect to the plant. Additional sleeves 57 are slidably mounted on the front posts 44 above the sleeves 56. Secured to each sleeve 57 is a tobacco leaf guide 66 which is adapted to extend between the leaves 68 which are to be removed from the stalk and the leaves 70 which are to be retained on the stalk for further ripening. The sleeves 57 are adjustably secured to the posts 44 by set means 59. Thus, the height of the stalk guides 60 and the leaf guides 66 can be adjusted to selectively engage leaves at a predetermined height on the stalk depending upon which pass the harvester is making with respect to the plants in that particular row. A guide rod 72 extends rearwardly from each leaf guide 66 and is supported in a socket 74 (FIG. 4) secured to a support 76 for a hydraulic motor 78. The guide rods 72 will be disposed along opposite sides of the row of tobacco plants for raising up the leaves 70 which are to be retained on the stalk 64 so that they will not be engaged by the defoliators.

A pair of sleeves 80 (FIG. 5) similar to the sleeves 56 are slidably mounted at the lower ends of the rearmost support posts 44 of the sub-frame 38. A pair of downwardly and inwardly extending support plates 82 are secured to each sleeve 80 and the sleeves 80 are adjustable vertically on the post 44 in the same manner as the sleeves 56 are adjustable. The support plates 82 are spaced apart a distance sufficient to allow the passage of the stalk of a tobacco plant therebetween and a pair of parallel rotary defoliators 84 are journalled at each end in the support plates 82 and in the laterally extending portions of the leaf guides 66. Each defoliator is comprised of the flexible, substantially rectilinear helical blade 84 secured between a pair of strips 86. The forward ends of the strips 86 are secured to a shaft which is journalled in the lateral support portion for the leaf guides 66 and the rear ends of the strips 86 are connected by universal couplings 87 to shafts 88 which are journalled in and extend through the support plates 82. The shafts 88 extend through the hydraulic motor supports 76 and are each operatively coupled to a hydraulic motor 78. Thus, the defoliators 84 are disposed on opposite sides of the tobacco stalks 64 and upon rotation of the same the flexible blades engage the stalk with a downward wiping motion to strip the tobacco leaves 68 from the stalk 64. While the width of each defoliator 84 is substantially uniform along the entire length thereof the spiral twist of one defoliator is offset longitudinally with respect to the spiral twist of the other defoliator so that a more efficient wiping engagement of the stalk 64 of the tobacco plant is achieved especially that portion of the stalk facing forwardly and rearwardly of the direction of movement of the harvester. By properly adjusting the height of the slidable sleeves 56, 57 and 80 on the vertical posts 44 the height of the defoliators, leaf guides 66 and conveyor rollers 90 can be varied. It is preferable to have the axes of the defoliators inclined downwardly from the front of the harvester toward the rear of the harvester as best seen in FIG. 1. Therefore, the front posts 44 can be shorter than the rear posts 44.

Figure 3:
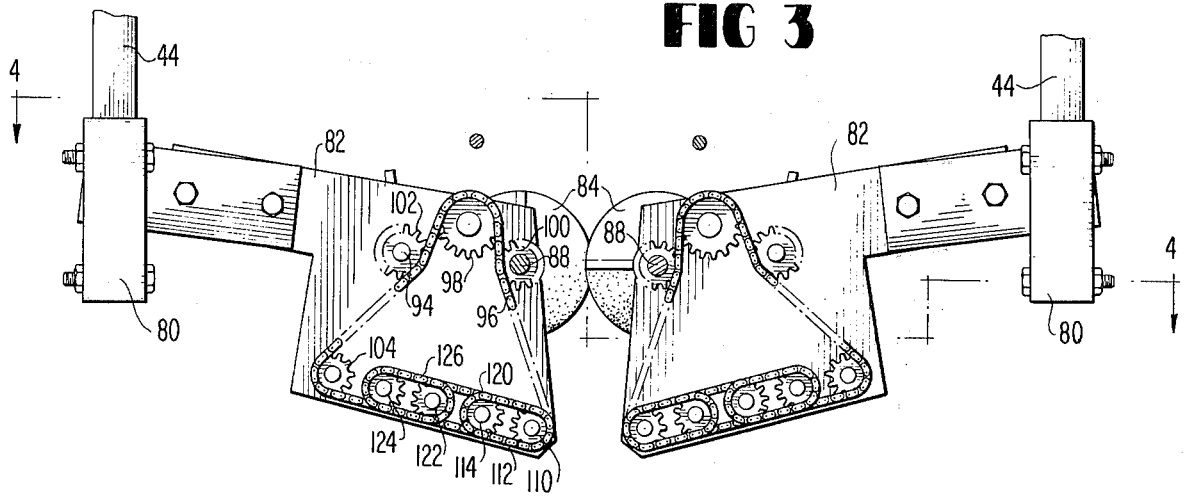
FIG. 3 is a sectional view taken along the line 3—3 of FIG. 1.
Figure 4:
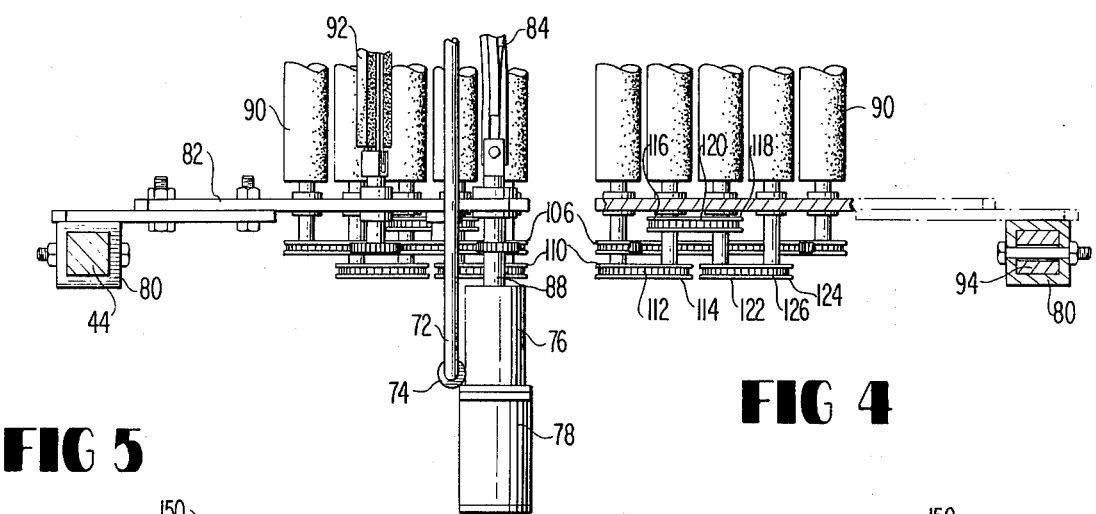
FIG. 4 is a sectional view taken along the line 4—4 of FIG. 3.

In order to convey the leaves 68 which have been stripped from the stalk 64 a plurality of parallel rollers 90 are rotatably mounted between the guide plates 60 and the support plates 82. Five rollers 90 are provided on each side of the row of tobacco plants and are disposed in an upwardly inclined plane away from the stalks of the tobacco plants. The rollers in each set on each side of the row of tobacco plants are driven in the same direction but opposite to the direction that the rollers in the other set are driven. The rollers 90 in each set are driven by the hydraulic motor 78 which drives the defoliator 84 on that side of the row of tobacco plants by means of a chain and sprocket drive as best seen in FIGS. 3 and 4. A relatively short rotary sweeper blade 92 is journalled in each support plate 82 parallel to the defoliators 84. Each sweeper blade is constructed of flexible rubber and is secured to a shaft 94 which extends through the support plate 82. The sweeper blade will clear the conveyor rollers 90 from any build-up of leaves or the like which might tend to accumulate adjacent the support plate 82. The sweeper blade 92 should rotate in the same direction as the defoliator blade 84 but in the opposite direction with respect to the five rollers 90 mounted on the same support plate 82. In order to accomplish this a continuous chain 96 is entrained about an idler sprocket 98 and meshes with the sprocket 100 on the defoliator shaft 88, the sprocket 102 on the sweeper shaft 94 and sprockets 104 and 106 on the ends of the support shafts for the two outermost rollers 90. An additional sprocket 110 is mounted on the same shaft as the sprocket 106 and a chain 112 extends about the sprocket 110 and a sprocket 114 on the adjacent roller shaft. A sprocket 116 on the same shaft with the sprocket 114 is coupled to a sprocket 118 on the next roller shaft by means of a chain 120. A sprocket 122 on the same shaft as the sprocket 118 is coupled to a sprocket 124 on the next shaft by means of a chain 126. In this way, a counterclockwise rotation will be imparted to each of the rollers 90 in the lefthand set as viewed in FIGS. 3 and 4 and a clockwise drive will be imparted to the defoliator shaft 88 and the sweeper shaft 94 on the same side of the row of tobacco plants. The elements are identical on opposite sides of the row of tobacco plants in FIGS. 3, 4 and 5. The same reference numerals are used on like parts.

As the harvested tobacco leaves 68 leave the rollers 90 they are deposited on identical longitudinal conveyor belts 130 which transport the leaves 68 toward the rear of the harvester. The conveyor belt 130 is entrained about a pair of rollers 132 and 134 journalled in a conveyor frame 136 which is supported at its forward end from the main frame 20 by vertical posts 138. The rear end of each conveyor frame 136 is supported by a substantially vertical conveyor frame 140 which in turn is supported by a depending bracket 142 on the main frame beam 52 by means of a strap 144. A second substantially vertically disposed conveyor frame 146 is also supported by the strap 144 parallel to the conveyor frame 140. A pair of conveyor belts 148 and 150 are entrained about rollers at opposite ends of the frames 140 and 146, respectively, so that the opposed faces of the belt 148 and 150 travel upwardly. The conveyor frame 146 is vertically offset relative to the conveyor frame 140 so that the lower end of the conveyor frame 146 will be spaced above the rear end of the conveyor frame 136. This will allow the tobacco leaves 68 which are being conveyed rearwardly on the belt 130 to pass under the lower end of the belt 150. Upon engagement of the leaves with the belt 148 the leaves will be conveyed upwardly between the two conveyor belts 148 and 150. A hood 152 is secured to the conveyor frame 146 by means of a pair of support brackets 154. The hood overlies the top ends of the conveyors 148 and 150 to deflect the tobacco leaves downwardly as they are ejected from the conveyor belts 148 and 150.

Identical conveyor belt systems 130, 148 and 150 are provided on each side of the defoliator mechanisms and all six conveyor belts are driven by a single hydraulic motor 156 which is secured to the conveyor frame 140 adjacent the top end thereof. The hydraulic motor 156 is operatively coupled to the top roller shaft 158 to impart rotation to the conveyor belt 148 adjacent the trailer 40. The rotation of the roller shaft 158 is imparted to the roller shaft 160 for the top roller of the other conveyor 148 through an intermediate shaft 162 which is connected to the shafts 158 and 160 by means of universal joints 164 and 166, respectively. A sprocket 168 on the ends of the shaft 160 drives a sprocket chain 170 which is entrained about an idler sprocket 172 on the conveyor frame 140 and the sprocket 174 mounted on the end of the top roller shaft 176 for the conveyor belt 150. The rotation of the top roller shaft 176 is transmitted to the top roller shaft 178 for the other conveyor belt 150 to an intermediate shaft 180 which is coupled to the shafts 176 and 178 by universal joints 182 and 184, respectively. Thus, the two top roller shafts for the belts 148 rotate in the opposite direction from the top roller shafts for the belts 150 so that the opposed surfaces of the belt will be moving in the same upward direction. A sprocket (not shown) is secured to the shaft of the lower roller 186 for the lower roller of each belt 148. The rotation of this sprocket is imparted to a sprocket (not shown) secured to the shaft of the roller 132 for the conveyor belt 130 by means of sprocket chain 190. It is also possible to eliminate the chain 170 and sprockets 168, 172 and 174 and use an additional hydraulic motor to drive the belts 50.

In order to prevent the tobacco leaves which are being transferred from the rollers 90 onto the conveyor belts 130 from falling off the side of the conveyor belts 130 a lightweight screen or shield 192 is vertically disposed along the outer edge of each conveyor belt 130. The shields 190 are pivoted to the vertical support posts 138 by means of hinges 194. The shield 192 is secured in the protective position by means of a strap 196 which can be secured to the rear frame 146 by a bolt 198 or any other suitable latching mechanism. Thus, the shield 192 can readily be swung outwardly to provide access to the conveyors and defoliators for purposes of servicing.

Adjacent the top end of the vertical conveyors 148 and 150 a transverse conveyor belt 200 is provided for receiving the tobacco leaves from the conveyors 148 and 150 and transporting the leaves laterally into the tobacco box 202 on the trailer 40. The conveyor belt 200 is entrained about a plurality of roller shafts 204 which are journalled for rotation between a pair of guide rails 206 and 208 which in turn are slidably mounted on the upper surface of the main frame 22. A pair of guide rails 210 are transversely secured to the main frame 22 to guide the conveyor frame for lateral movement. The vertical shield 212 is secured to the top of the conveyor supporting rail 206 to prevent the tobacco leaves from falling off the edge of the conveyor belt 200.

Figure 8:
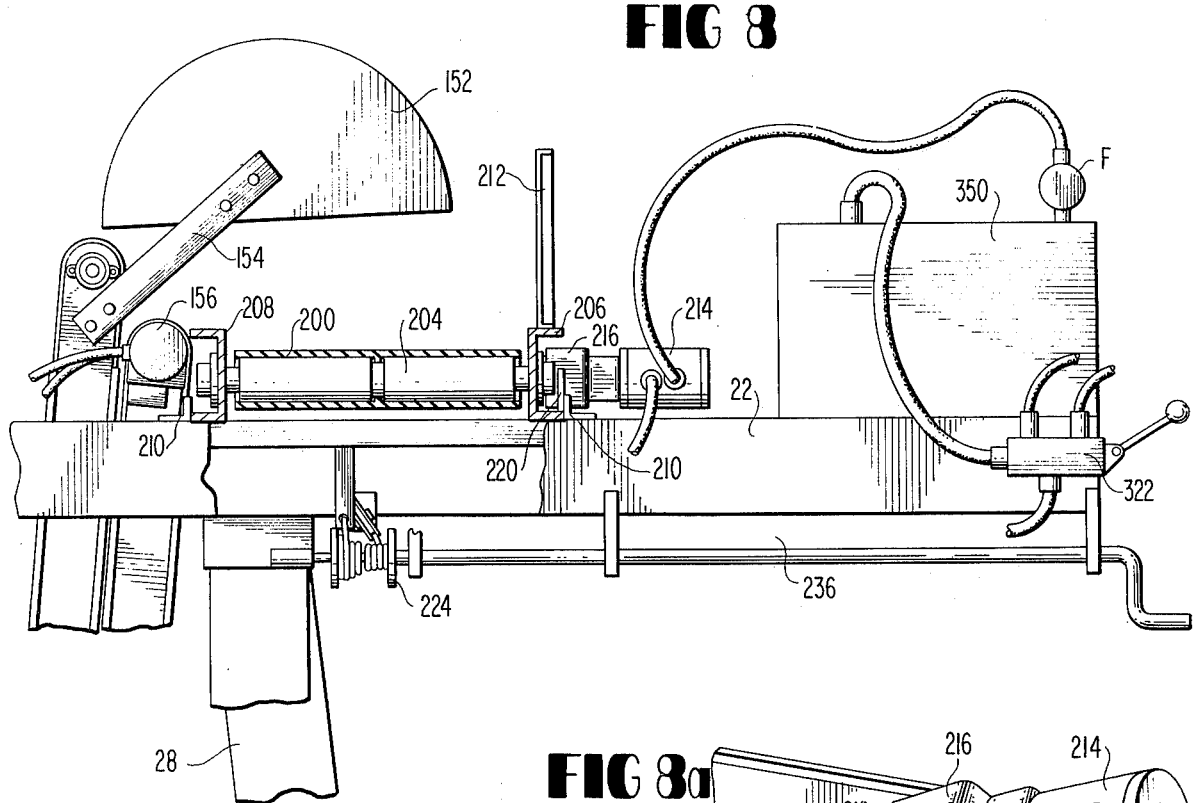
FIG. 8 is a sectional view taken along the line 8—8 of FIG. 7.
Figure 8A:
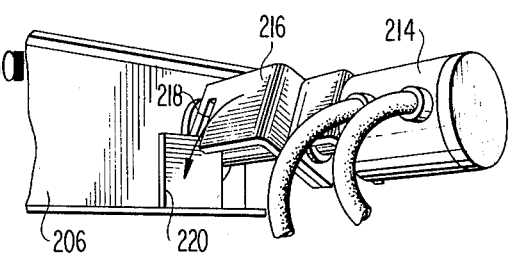
FIG. 8a is a perspective detailed view of a hydraulic motor connection according to the present invention.

A hydraulic motor 214 is detachably connected to a shaft extension of one of the conveyor rollers 204 by means of a spline connection (not shown). In order to prevent the housing of the motor 214 from freely rotating with the roller 204 and to prevent the axial movement of the motor on the shaft extension of the roller 204 an L-shaped bracket 216 is secured to the motor housing. A slot 218 is formed parallel and closely adjacent to the forwardly extending edge of the L-shaped bracket 216 and is adapted to engage the plate 220 which is secured to the support rail 206 in an offset manner. Since the roller 204 which is driven by the motor 214 rotates in a counterclockwise direction as viewed in FIG. 8a so that the conveyor belt 200 will travel in the direction of the arrow 222 the torque applied to the housing of the motor will be transmitted through the bracket 216 to normally force the slot 218 into engagement with the plate 220. Thus, the motor will be held securely on the shaft during rotation of the motor but the motor can readily be removed from the shaft for servicing or replacement.

As previously described the tobacco harvester 20 can be shifted laterally relative to the towing tractor so that the harvester will span either the first or second row of tobacco adjacent to the tractor. However, it will still be necessary for the trailer 40 to follow directly behind the tractor. When the harvester is traversing the first row of tobacco plants the trailer 40 will be closely adjacent the harvester but when the harvester is traversing the second row of tobacco the trailer 40 will be spaced from the harvester by a substantial distance. In order to properly direct the tobacco from the conveyor belt 200 into the tobacco box 202 on the trailer 40 the end of the conveyor belt 200 must be shifted to compensate for the change in distance between the harvester and the trailer. As discussed previously the conveyor belt 200 is mounted between a pair of slidable rails 206 and 208 on the upper surface of the main frame 22. Thus, the conveyor 200 can be shifted between the solid line position and the phantom line position as shown in FIG. 7. In order to facilitate the shifting of the conveyor which could be carried out by manually pushing the conveyor back and forth on the frame 22, a crank and pulley system has been provided for shifting the conveyor with greater ease. The pulley arrangement for shifting the conveyor is best seen in FIGS. 6 and 7 and is comprised of a pair of pulleys 224 and 226 which are secured to the longitudinally extending beams of the main frame 22. A cross bar 228 is secured beneath and between the side frame members 206 and 208 of the conveyor 200 and is provided with a pair of downwardly extending lugs 230 and 232. A cable 234 is secured at each end to the lugs 230 and 232 and extends about the pulleys 224 and 226. The pulley 224 is mounted on the shaft of a crank 236 so that upon rotation of the crank handle 236 the cable 234 will operate to shift the conveyor 200 to the left or right as viewed in FIG. 7 depending upon the direction of rotation of the crank 236. Since the cross bar 248 is disposed between the two side beams of the main frame 22 the cross bar will effectively act as a limit stop against the main frame 22 in opposite direction of movement.

Figure 10:
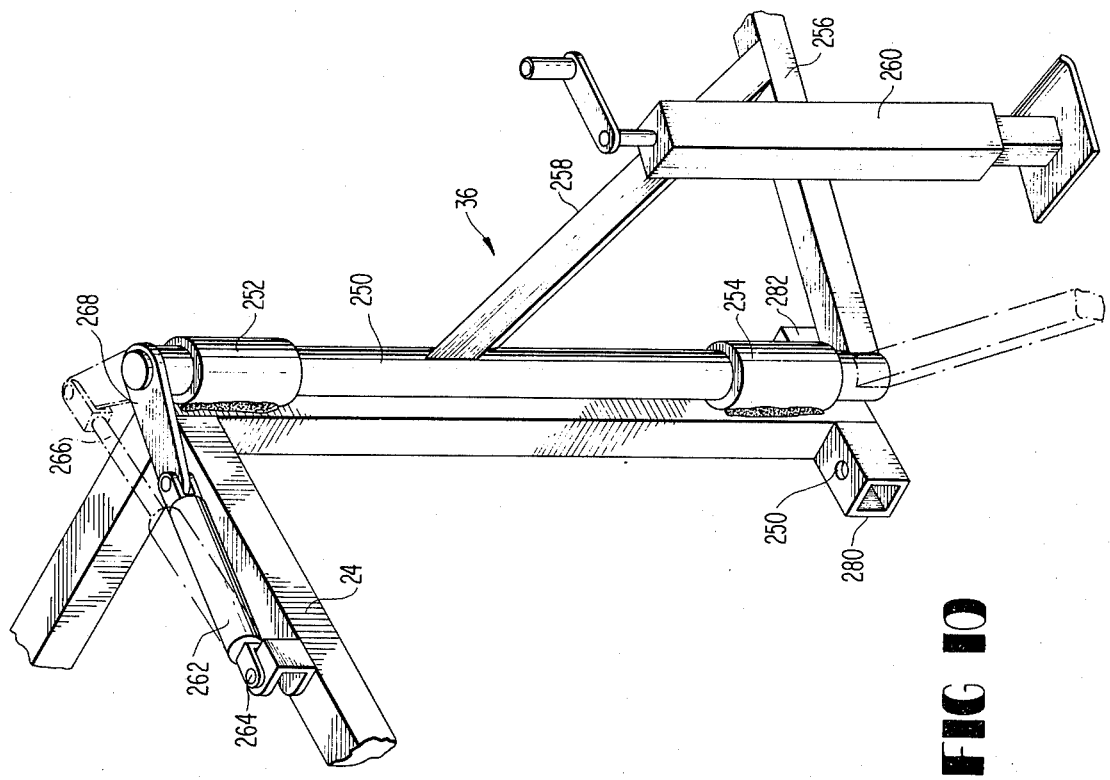
FIG. 10 is a partial perspective view of the hydraulically operated hitch for the harvester according to the present invention.

In order to accomplish the lateral shifting of the tobacco harvester 20 relative to the tractor 30 that the harvester will transverse either the first or second row of tobacco adjacent the tractor, the harvester 20 is provided with a pivoted hydraulically operated tongue assembly 36 as best shown in FIGS. 10 and 11. The pivoted tongue assembly 36 is comprised of a vertical shaft 250 which is pivotally mounted in a pair of cylindrical sleeves 252 and 254 which in turn are secured to the vertical support post 34 by welding or the like. A horizontally extending tongue 256 is secured to the lower end of the shaft 250 and the free end thereof is additionally supported by means of a diagonal brace 258 connected between the shaft 250 and the tongue 256. A jack stand 260 is connected to the tongue 256 by any suitable means for supporting the front end of the harvester when it is not secured to a tractor. The construction of the jack stand 260 can be any one of several conventional constructions. A double acting hydraulic cylinder 262 is pivotally mounted on the lateral extension 24 of the main frame 22 by means of a pivot pin 264. The piston shaft 266 is pivotally connected to an arm 268 which is rigidly secured to the upper end of the shaft 250 so that upon extension of the piston shaft 266 from the full line position to the phantom line position the tongue 256 will be pivoted from the full line position to the phantom line position.

Figure 11A:
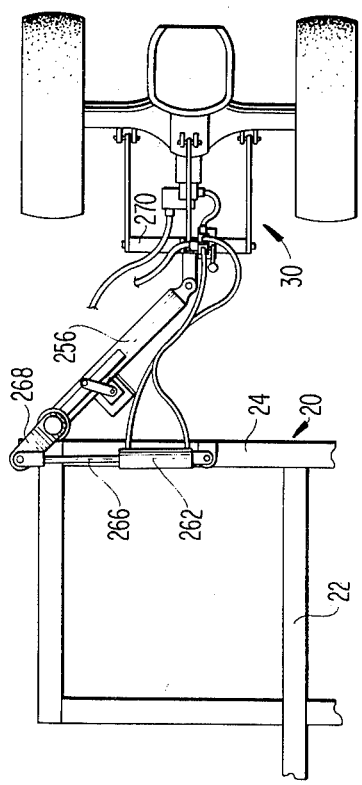
FIG. 11a is a top plan view showing the hydraulic coupling arrangement between the tractor and harvester with the harvester disposed in operative relation to the first row of tobacco adjacent the tractor.
Figure 11B:
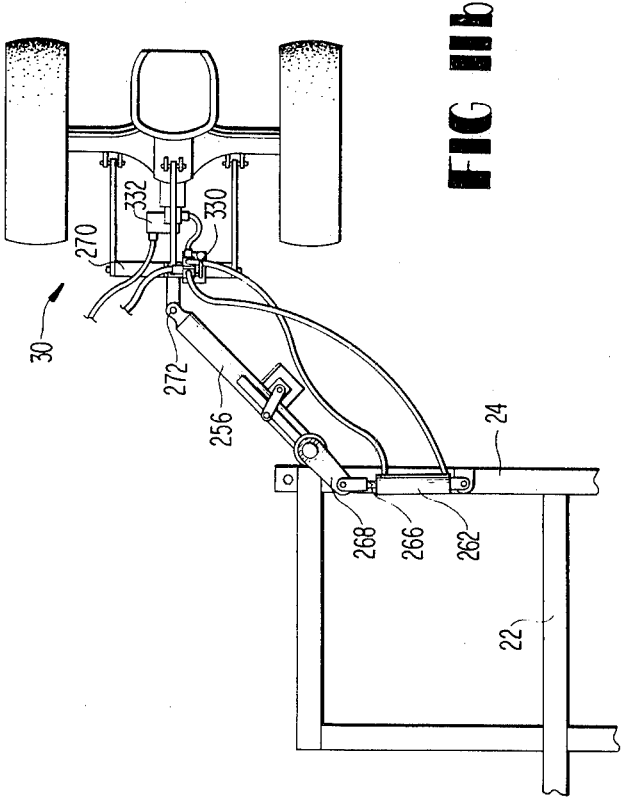
FIG. 11b is a top plan view of the hydraulic coupling arrangement between the tractor and harvester with the harvester in operative relation with the second row of tobacco from the tractor.
Figure 12:
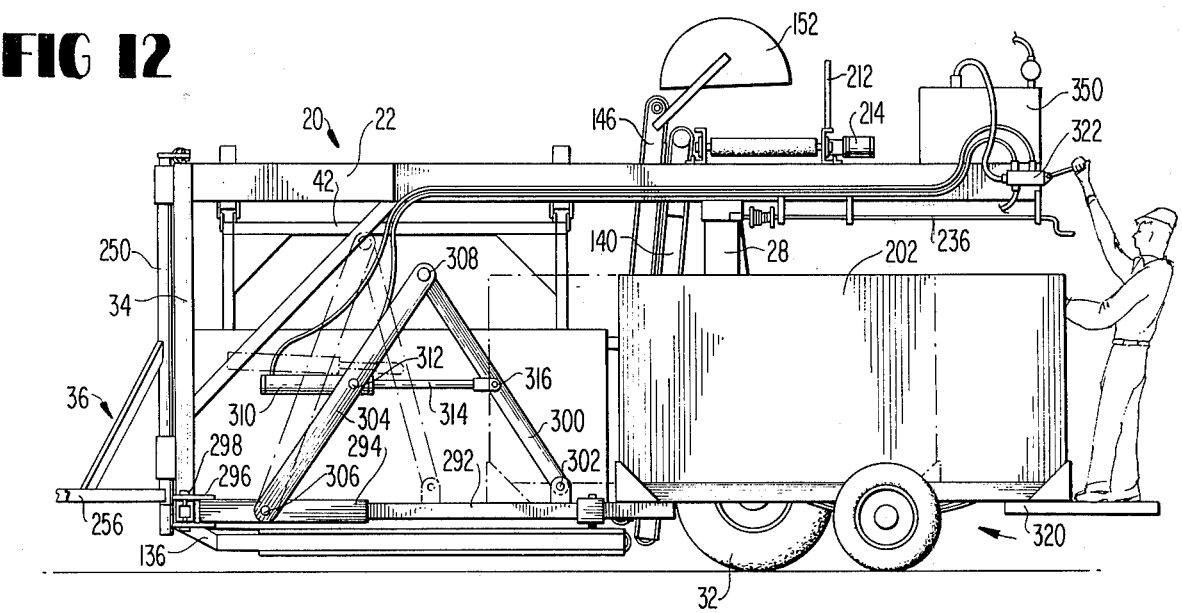
FIG. 12 is a side elevation view showing the harvester, tobacco receptacle carrying trailer and the hydraulic coupling arrangement therebetween.
Figure 13:
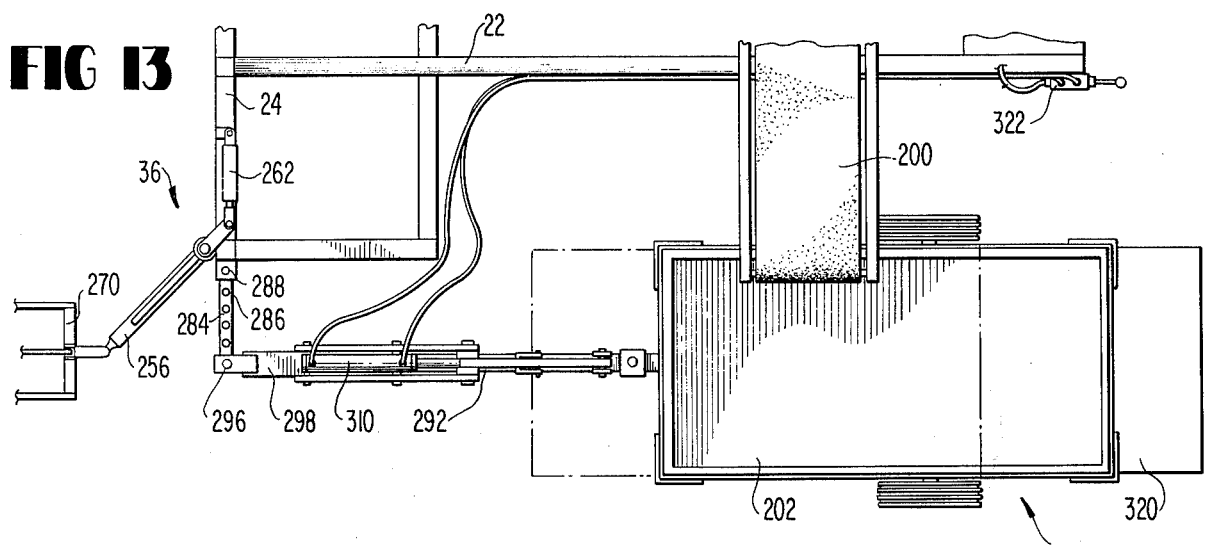
FIG. 13 is a top plan view of the harvester, trailer, tractor hitch and couplings therebetween.

In FIG. 11 the free end of the tongue 256 is connected to the three point hitch 270 which is mounted on the tractor 30 by means of a conventional pin arrangement 272. When the piston rod 266 is in the extended position as shown in FIG. 11a the tongue 256 will be pivoted in such a manner that the harvester 20 will be disposed in operative relation with respect to the first row of tobacco adjacent the tractor. When the piston rod 266 is retracted as shown in FIG. 11b the harvester 20 will be shifted to the left of the tractor as viewed from the front of the tractor a distance to place the harvester in operative relation to the second row of tobacco from the tractor. In order to tow the trailer 40 having the tobacco box 202 thereon in the proper position relative to the harvester 20 a pair of laterally extending opposed hitch sockets 280 and 282 are provided at the bottom of the vertical support posts 34. A hitch bar 284 having a plurality of apertures 286 spaced along the length thereof is inserted into either the socket 280 or the socket 282 depending upon which row of tobacco is being harvested and secured therein by a pin 288 extending through the aperture 290 in the socket and the end aperture 286 in the hitch bar 284. The trailer 40 is provided with a forwardly extending tongue 292 having a telescopic extension 294 slidably mounted thereon. The forward end of the telescopic extension 294 is provided with a coupling 296 which can be secured to the hitch bar 284 by means of a pin 298 extending through the appropriate apertures in the coupling 296 and the hitch bar 284. A first upwardly extending lever 300 is pivotally connected to the trailer tongue 292 at 302 and a second upwardly extending lever 304 is pivotally connected to the telescopic extension 294 at 306. The upper ends of the levers 300 and 304 are pivoted to each other at 308. A double acting piston and cylinder arrangement is provided between the two levers with the cylinder 310 being pivotally connected to the lever 304 at 312 and the outer end of the piston rod 314 being pivotally connected to the lever 300 at 316. Thus, upon the extension of the piston rod 314 to the position shown in FIG. 12 the telescopic tongue members 292 and 294 will be extended relative to each other so that the trailer 40 carrying the box 202 will be disposed in the solid line position. Upon the movement of the piston rod 314 into the cylinder 310 the levers 304 and 300 will be moved to the phantom line position in FIG. 12 thereby drawing the trailer tongue 292 into the telescopic extension 294 to shift the trailer 40 and the tobacco box 202 forwardly relative to the tobacco harvester 20 to the phantom line position. During the harvesting operation the fluid pressure will be applied alternately to opposite ends of the cylinder 310 to continuely shift the trailer forwardly and rearwardly relative to the end of the conveyor 200 to evenly distribute the tobacco leaves in the box 202 on the trailer 40.

The trailer 40 is provided with a platform 320 on the rear thereof upon which an attendant can stand. The control valve 322 for the cylinder 310 is mounted on the side of the main frame 22 adjacent the trailer 40 so that the attendant standing on the platform 320 can readily operate the valve 322 to selectively move the trailer forwardly and rearwardly relative to the end of the conveyor 200 with the desired speed and frequency. The crank 236 for laterally shifting the conveyor 200 is also disposed adjacent the control valve 322 for the convenient operation by the attendant standing on the platform 320 of the trailer 40.

Figure 9:
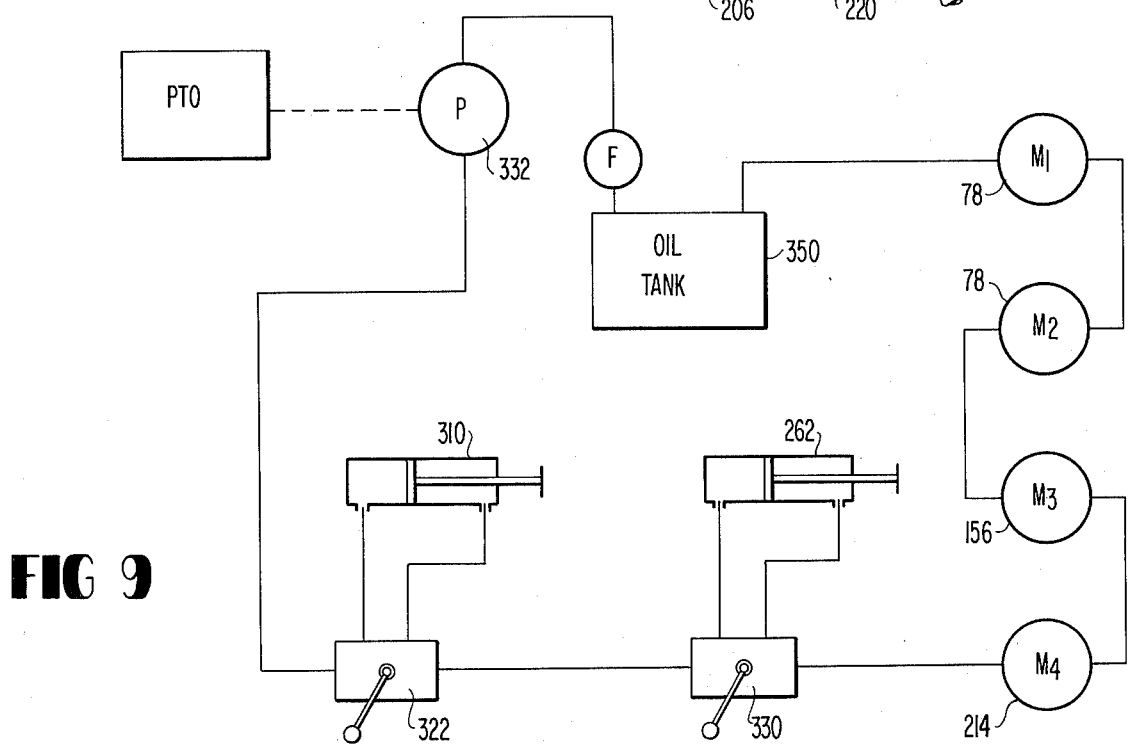
FIG. 9 is a schematic view of the hydraulic circuit according to the present invention.

The control valve 330 for the double acting piston and cylinder arrangement 262 which shifts the tobacco harvester from one row of tobacco to the other is mounted on the three point hitch 270 and a hydraulic pump 332 for supplying fluid under pressure to all of the hydraulic motors and cylinders is mounted on the rear of the tractor 30 in operative relation with the power takeoff shaft of the tractor. The various hose and pipe connections to the hydraulic motors and cylinders have been partially omitted from the figures showing the stuctural details for the sake of clarity. FIG. 9, however, shows the schematic arrangement for the complete hydraulic circuit for operating all of the hydraulic elements according to the present invention. The pump 332 mounted on the tractor 30 and driven by the power takeoff (PTO) is connected in series with the two hydraulic motors 78 for driving the defoliators, sweepers and roller conveyors, the hydraulic motor 156 for driving the conveyor belts 130, 148 and 150, the hydraulic motor 214 for driving the lateral conveyor 200, the filter F, the oil tank 350, the control valve 330 for the double acting piston and cylinder arrangement 262 and the control valve 322 for the double acting piston and cylinder arrangement 310. The oil tank 350 is a sealed tank which acts as a reservoir and a cooler and is mounted at the extreme rear end of the main frame 22. Since the control valve 330 is mounted directly on the three point hitch 270 of the tractor 30 it can be operated easily by the tractor driver when it is desired to shift the tobacco harvester from one row of tobacco to the other. Obviously, the shifting will not take place while the tobacco harvester is traversing a row of tobacco but will take place at the end of a row of tobacco. When the tractor operator operates the control valve 330 to shift the harvester from one row of tobacco to the other the attendant standing on the rear of the trailer 40 will operate the crank 236 to shift the conveyor 200 so that the end thereof will be in proper relationship with respect to the trailer 40 which always remains directly behind the tractor. It will also be necessary for the attendant to shift the hitch bar 284 from one socket to the other to properly locate the trailer 40 in the lateral direction relative to the harvester 20. It is also contemplated that the trailer 40 could be coupled directly to the three point hitch 270 by any suitable extension so that the trailer would always be directly behind the tractor.

Figure 14:
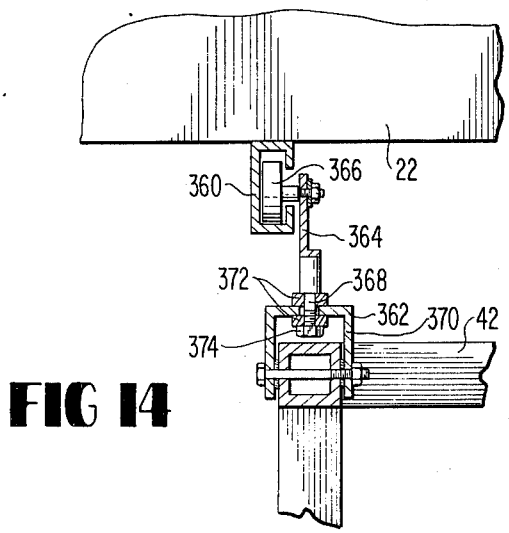
FIG. 14 is a detailed view, partly in section, of a modified support for the defoliator carrying sub-frame relative to the main frame.
Figure 15:
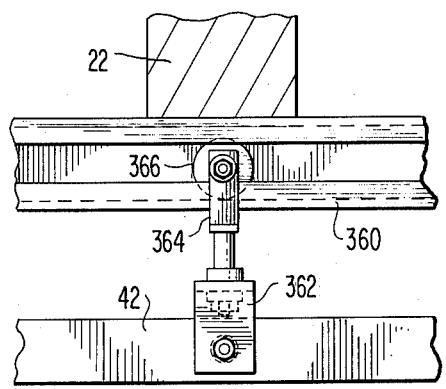
FIG. 15 is a side elevation view of the support coupling shown in FIG. 14.

A modified support arrangement for movably mounting the sub-frame 42 relative to the main frame 22 is shown in FIGS. 14 and 15. According to this embodiment a pair of laterally extending C-shaped guide rails 360 are mounted on the underside of the main frame 22 in lieu of the straps 50. A U-shaped bracket 362 is secured to the top of the sub-frame 42 at the midpoint of each end thereof. A hanger 364 is movably supported on the C-shaped guide track 360 by means of a roller 366 which is journalled for rotation in the upper end of the hanger 364. The lower end of the hanger 364 is provided with a swivel connection to the bracket 362 which consists of a pivot shaft 368 extending through an aperture in the bracket 362. A pair of anti-friction washers 372 engage the opposite surfaces of the bracket 362 about the shaft 368 and are held thereon by means of the nut 374. Thus, if there is any variation in the alignment of the row of tobacco plants the guide plate 60 will engage the tobacco plant and shift the sub-frame 42 laterally by means of the rollers 366 riding in the transverse tracks 360. In the event that the row of tobacco plants is disposed in an angle relative to the longitudinal axis of the tobacco harvester the sub-frame 42 can pivot about the swivel connections so that the axis of the sub-frame will be aligned with the row of tobacco plants but be disposed at an angle relative to the axis of the main frame 22.

A modified defoliator construction is shown in FIGS. 16–19 which utilizes a pair of vibrating rods 400 instead of the rotary flexible blade defoliators 84 described previously. Each rod 400 would be mounted on the opposite side of a row of tobacco plants and since the mechanism would be identical on each side the same reference numerals are utilized to describe both rods and the means for actuating the same. The rods 400 are comprised of a solid rod 402 of steel or the like having a soft resilient sheath 404 thereon to prevent injury to the stalks of the tobacco plants. A plurality of flexible fingers 406 extend laterally from each of the rods 400 toward the other rod with the fingers 406 on one rod being interdigitated with the fingers 406 on the other rod. The fingers 406 have sufficient rigidity so that upon engagement with the tobacco leaf which extends out of the stalk of the tobacco plant in a direction substantially parallel to the rods 400 the fingers 406 will be able to exert sufficient force on the leaf to strip it from the stalk. The rods 400 are rigidly secured to a pivoted bracket 410 which in turn is secured to the shaft 412 of a rotary to oscillating type mechanism 414. The mechanism 414 is secured to the support plate 82 which in turn is secured to the vertical support rod 44. A motor 78 is secured to the input shaft 416 of each mechanism 414 in the same manner in which the motors 78 were connected to the shafts of the rotary defoliators. The drive train for rotating the rollers 90 is identical to that previously disclosed and is not deemed necessary to repeat such description. Although the rotary to oscillating type mechanism 414 could be of any desirable form an example of such a mechanism is set forth in FIGS. 18 and 19. The input shaft 416 is provided with an eccentric crank pin 418 having an enlarged ball-type actuator 420 on the end thereof. The actuator 420 is disposed in the slot 422 of a U-shaped lever 424 which in turn is mounted on the shaft 412 to which the bracket 410 is secured. The shaft 412 is journalled for oscillation in bearing 416 within the box 414. Upon rotation of the shaft 416 as shown in FIGS. 19a and 19b the eccentrically mounted ball actuator 420 will cause the lever 424 secured to the shaft 412 to oscillate between the two extreme positions shown in FIGS. 19a and 19b. Any other suitable type of mechanism which would impart a vibratory or oscillating movement to the rods 400 could be substituted for the mechanism shown in FIGS. 16–19. The principle requirement is that the rods 400 move up and down in a substantially vertical plane on opposite sides of the tobacco stalk to knock the ripe leaves from the stalk. The fingers 406 on the rods 400 are provided with sufficient flexibility so that the stalk of the plant can readily pass between the two rods 400 as the harvester moves down the row of tobacco plants.

Figure 5:
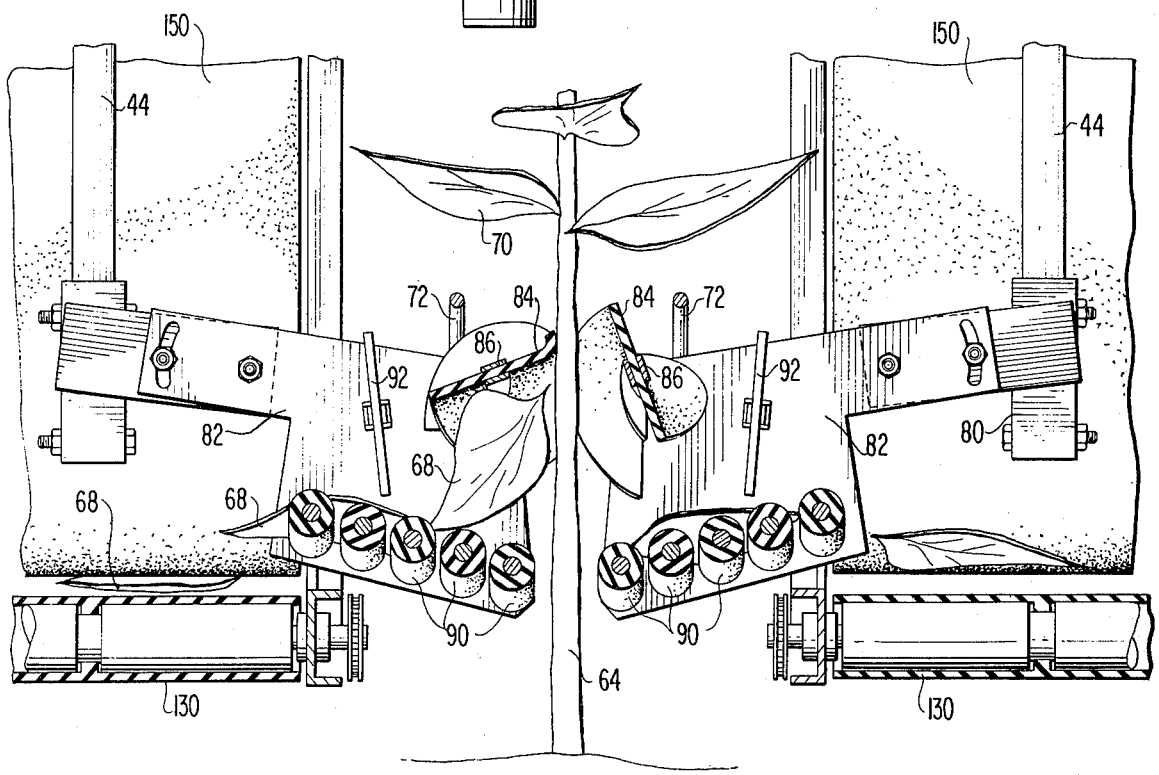
FIG. 5 is a sectional view taken along the line 5—5 of FIG. 1.

In summary, the present invention provides a tobacco harvester which is inexpensive, more versatile and more efficient than previous types of tobacco harvesters. In order to achieve this versatility the vertical conveyor belts can readily be adjusted both vertically and laterally with respect to each other by means of slotted brackets and bolts (FIG. 1). Further adjustment can be provided by varying the distance between the two sets of rollers 90. In order to accomplish this the support plates 82 are each constructed of two parts pivoted together and provided with an arcuate slot and bolt arrangement as shown in FIGS. 3 and 5 to lock the two parts in adjusted position.

While the harvester described above is adapted to be pulled by a tractor the harvester could readily be provided with its own power drive and steering arrangement at an increase in cost. The transverse conveyor frame could also be shifted directly by a hydraulic piston and cylinder arrangement. It is also conceivable that a rack and pinion type drive could be provided for shifting the transverse conveyor. The detachable connection for the hydraulic motor 214 (FIG. 8a) can also be provided for the other motors.

Figure 16:
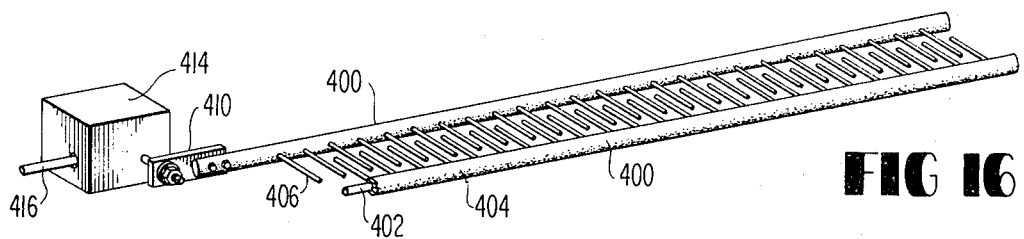
FIG. 16 is a perspective view of a modified defoliator arrangement according to the present invention.
Figure 17:
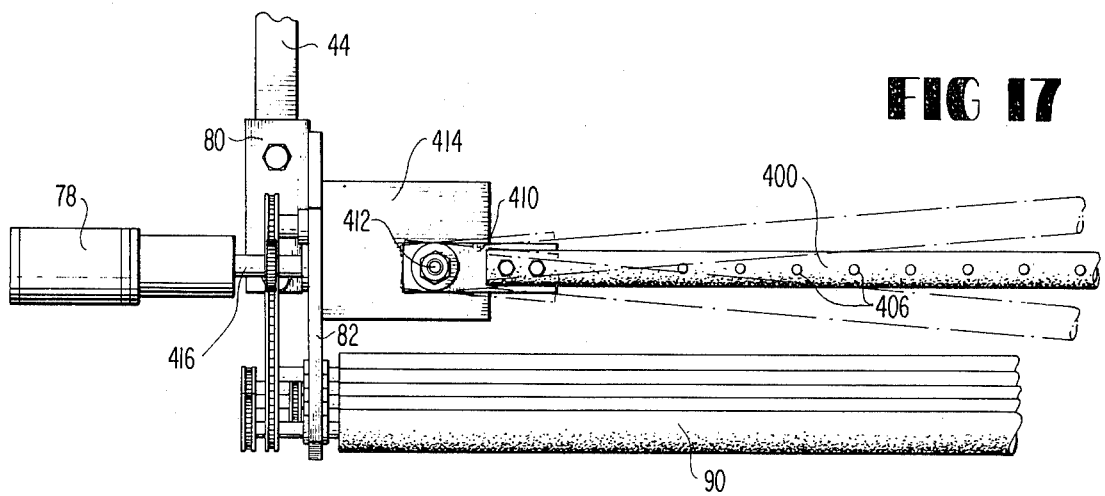
FIG. 17 is a detailed side elevation view of the modified defoliator arrangement shown in FIG. 16.
Figure 18:
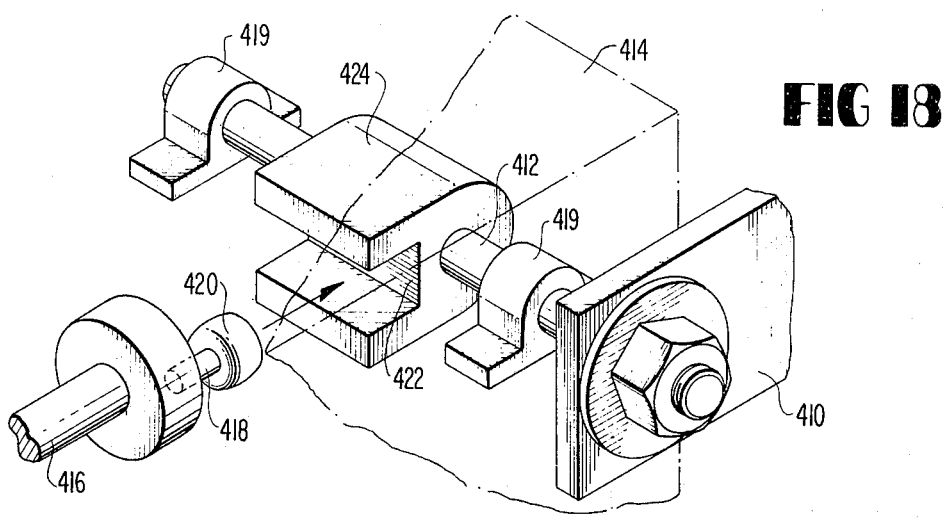
FIG. 18 is a perspective view of the drive mechanism for the modified defoliator mechanism shown in FIG. 17.
Figures 19A, 19B:
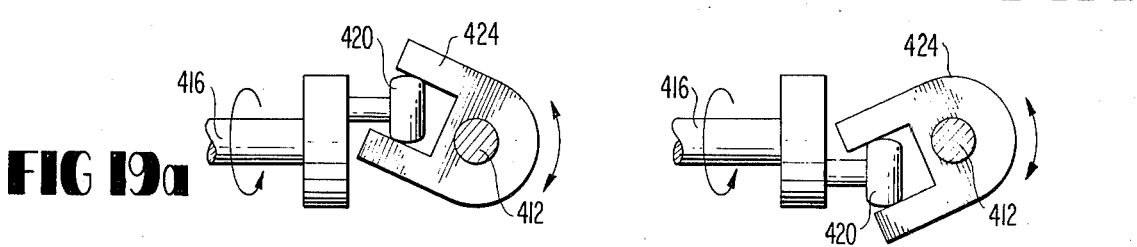
FIGS. 19a and 19b show a detail of the drive mechanism of FIG. 18 in two different positions, respectively.

The defoliator arrangement shown in FIGS. 16 and 17 primarily requires the rods to be movable in a direction transverse to their longitudinal axes in a substantially vertical plane. Thus, any type of vibrating or oscillating type drive could be provided for the rods so that either end or both ends of the rods would move up and down. The rods would generally be angled slightly upwards from the rear end to the front end of the harvester as are the rotary defoliators.

While any type of trailer could be used the best arrangement involves the case of a flat bed trailer having a large tobacco curing box mounted thereon. The hydraulic arrangement for shifting the trailer forwardly and rearwardly of the harvesters could be coupled directly between the harvester and trailer.

Finally, the present harvester could be modified to provide an additional set of defoliators so that rows of tobacco could be harvested simultaneously. The movable hitch would prove beneficial in lining up the harvester on the rows relative to the tractor and the movable transverse conveyor would still prove useful due to the fact that tobacco rows are spaced differently by different farmers. Likewise, the two sets of defoliators would have to be adjustably spaced.

While the invention has been particularly shown and described with reference to preferred embodiments thereof it will be understood by those in the art that the foregoing and other changes in form and details may be made therein without departing from the spirit and scope of the invention.

What is claimed is:

1. A tobacco harvester comprising wheeled main frame means adapted to move along a row of tobacco plants, support means connected to said frame means, a pair of parallel elongated and longitudinally disposed defoliating means movably mounted on said support means and conveying means for moving leaves harvested by said defoliating means away from said defoliating means, said defoliating means comprising a pair of parallel spaced apart rods, one on each side of said row, and means for moving said rods transversely of the axes thereof in substantially vertically disposed parallel planes for engaging and removing selected leaves on said plants.

2. A tobacco harvester as set forth in claim 1 wherein said rods are provided with a resilient covering having a plurality of laterally extending flexible parallel fingers, the fingers on each rod extending towards each other and interdigitated with each other to engage the stalks of the tobacco plants as the stalks move between said rods.

3. A tobacco harvester comprising wheeled frame means adapted to move along a row of tobacco plants, a pair of defoliator means movably mounted in said frame means in spaced apart relation for receiving a row of tobacco plants therebetween, conveyor means mounted in said frame means for moving harvested tobacco leaves from the vicinity of said defoliator means and depositing the harvested leaves from one side of said harvester from a level higher than the level of said defoliator means, trailer means having a tobacco receiving receptacle thereon and coupling means for connecting said trailer means to said harvester for movement parallel to said harvester below the discharge point of said conveyor means, and coupling means for reciprocating said trailer means relative to said harvester in the direction of movement of said harvester for distributing the tobacco within said receptacle.

4. A tobacco harvester comprising wheeled frame means adapted to move along a row of tobacco plants, a pair of defoliator means movably mounted in said frame means in spaced apart relation for receiving a row of tobacco plants therebetween, conveyor means mounted in said frame means for moving harvested tobacco leaves from the vicinity of said defoliator means and depositing the harvested leaves from one side of said harvester from a level higher than the level of said defoliator means, trailer means having a tobacco receiving receptacle thereon and coupling means for connecting said trailer means to said harvester for movement parallel to said harvester below the discharge point of said conveying means, said coupling means include hitch means for connecting said trailer means to said harvester in either of two spaced apart lateral positions relative to said harvester.

5. A tobacco harvester as set forth in claim 3 wherein said trailer means is provided with a first tongue member secured to said trailer means and a second tongue member detachably connected to said harvester and telescopically disposed relative to said first tongue member, lever means pivotally connected to each other and said first and second tongue members and hydraulic piston and cylinder means operatively connected to said levers for telescopically extending and retracting said first and second tongue members relatie to each other to vary the distance of the trailer means from the point of connection of said second tongue means to said harvester.

6. A tobacco harvester comprising wheeled main frame means adapted to be pulled by a tractor along a row of tobacco plants, tongue means pivoted on said harvester for coupling said harvester to a tractor, actuator means for controlling the position of said tongue to selectively position said harvester rearwardly and laterally of said tractor, subframe means having a pair of defoliating means movably mounted therein parallel to each other in spaced apart relation to receive the row of tobacco plants therebetween, means movably mounting said subframe on said main frame for lateral movement relative thereto, conveyor means for transporting harvested tobacco leaves from said defoliator means rearwardly and upwardly to an elevated platform on said main frame, additional conveyor means disposed transversely of said main frame slidably mounted on said elevated platform for receiving the leaves from said conveyor means for conveying the leaves laterally into a receptacle moving along side said harvester behind said tractor and means for laterally shifting said additional conveyor means on said elevated platform to locate the discharge end of said additional conveyor means over said receptacle to compensate for the lateral movement of the harvester relative to the tractor when said tug means is pivoted by said actuator means, said means for laterally shifting said conveyor being comprises of cable and pulley means connected between said main frame and said conveyor and crank means for operating said cable pulley means.

7. A tobacco harvester comprising wheeled main frame means adapted to move along a row of tobacco plants, subframe means having front and rear support means, a pair of elongated parallel defoliating means movably mounted in said front and rear support means at opposite ends thereof in spaced apart relation to receive the row of tobacco plants therebetweeen and means movably supporting said subframe means on said main frame means for lateral movement relative thereto, said means for movably supporting said subframe means being comprised of front and rear pivot means whereby said subframe is mounted for swinging pivotal movement relative to said main frame means about an axis extending longitudinally of said main frame means said vertically adjustable means for connecting said front and rear pivot means to said main frame means.

* * * * *